(12) United States Patent
Speckmaier et al.

(10) Patent No.: US 10,023,157 B2
(45) Date of Patent: Jul. 17, 2018

(54) VEHICLE WASHING INSTALLATION

(71) Applicant: Alfred Kärcher GmbH & Co. KG, Winnenden (DE)

(72) Inventors: André Speckmaier, Wuestenrot (DE); Lars Eckstein, Bietigheim-Bissingen (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 80 days.

(21) Appl. No.: 14/958,343

(22) Filed: Dec. 3, 2015

(65) Prior Publication Data

US 2016/0082932 A1 Mar. 24, 2016

Related U.S. Application Data (63) Continuation of application No. PCT/EP2013/061581, filed on Jun. 5, 2013.

(51) Int. Cl.
*B60S 3/06* (2006.01)
*B08B 3/10* (2006.01)
*B60S 3/00* (2006.01)

(52) U.S. Cl.
CPC .................. *B60S 3/06* (2013.01); *B08B 3/10* (2013.01); *B60S 3/002* (2013.01); *B60S 3/066* (2013.01)

(58) Field of Classification Search
CPC ............................................ B60S 3/00–3/066
See application file for complete search history.

(56) References Cited

U.S. PATENT DOCUMENTS

| 4,872,238 A * | 10/1989 | Crotts ..................... B60S 3/002 15/302 |
| 2002/0144366 A1* | 10/2002 | Ikari ....................... B60S 3/002 15/53.3 |
| 2008/0313832 A1 | 12/2008 | Wimmer et al. |
| 2013/0047355 A1 | 2/2013 | Heid et al. |

FOREIGN PATENT DOCUMENTS

| CN | 200974528 | 11/2007 | |
| DE | 37 21 219 | 1/1989 | |
| DE | 202 13 580 | 2/2004 | |
| EP | 0 505 766 | 9/1992 | |
| EP | 1 548 223 | 6/2005 | |
| JP | 2009-073300 | 4/2009 | |
| WO | WO 2011134523 A1 * | 11/2011 | ................ B60S 3/06 |

* cited by examiner

*Primary Examiner* — Jason Y Ko
*Assistant Examiner* — Spencer E Bell
(74) *Attorney, Agent, or Firm* — Womble Bond Dickinson (US) LLP (57) ABSTRACT

A vehicle washing installation is provided including first and second supports on which a horizontal roof wash brush and a roof drying unit are held for movement between an upper and a lower end position, and a splash guard element arranged between the roof wash brush and the roof drying unit at the upper end position. The splash guard element has a recess extending in the area between a lateral edge and a lower edge of the splash guard element and into which a part of the roof drying unit in its upper end position extends, wherein the lower edge has a drain channel extending over the width of the splash guard element, the drain channel having an end section movable between a first position where it extends over the entire width of a recess and engages under the recess and a second position where it releases the recess.

10 Claims, 6 Drawing Sheets

VEHICLE WASHING INSTALLATION

CROSS-REFERENCE TO RELATED APPLICATIONS

This application is a continuation of international application number PCT/EP2013/061581 filed on Jun. 5, 2013, which is incorporated herein by reference in its entirety and for all purposes.

BACKGROUND OF THE INVENTION

The invention relates to a vehicle washing installation comprising a first and a second support on which a roof wash brush rotatable about a horizontal axis of rotation and a roof drying unit are each held for movement back and forth between an upper and a lower end position and comprising a splash guard element which is arranged between the roof wash brush and the roof drying unit at a level of the upper end positions of the roof wash brush and the roof drying unit.

The roof wash brush provides for cleaning the engine hood, the windscreen and the roof of a motor vehicle and also the area of the boot lid. The roof wash brush can be adjusted in its height according to the course of the vehicle's contour. Cleaning liquid, preferably water, can be applied to the vehicle by way of spray nozzles. In order to permit drying of the vehicle at the end of a cleaning process, the vehicle washing installation has a roof drying unit which is mounted to the two supports, also in a height-adjustable manner, and is capable of being adjusted in its height according to the course of the vehicle's contour. Like the roof wash brush, the roof drying unit can be moved back and forth between an upper end position and a lower end position.

It has proven advantageous for the roof wash brush and the roof drying unit to have a splash guard device arranged therebetween, said splash guard device being positioned at a level of the upper end positions of the roof wash brush and the roof drying unit. The splash guard device is configured as a sheet-form element and can be formed for example from sheet metal or from a plastics material. It comprises two lateral edges, each facing towards a support, and an upper and a lower edge which extend between the lateral edges.

In order to wash a vehicle, the vehicle can be moved relative to the supports. It may also be provided for the vehicle washing installation to be configured as a gantry-type washing installation in which the two supports are interconnected at their upper ends via a traverse and can be moved together with the traverse along a vehicle.

It is an object of the present invention to improve a vehicle washing installation of the type mentioned at the outset such that it provides a compact configuration and achieves a very good cleaning result.

SUMMARY OF THE INVENTION

In accordance with the invention, this object is accomplished in a vehicle washing installation of the generic kind by the splash guard element having at least one recess which extends in the area between a lateral edge and the lower edge of the splash guard element and into which a part of the roof drying unit extends when the roof drying unit assumes its upper end position, wherein the lower edge of the splash guard element has arranged thereon a drain channel extending over the entire width of the splash guard element, said drain channel having at least one movable end section which is movable back and forth between a first and a second position, wherein said at least one movable end section, when in its first position, extends over the entire width of a recess and engages under the recess and, when in its second position, releases the recess.

In the vehicle washing installation constructed in accordance with the invention, the splash guard element has a recess in the area between its lower edge and at least one lateral edge thereof. This provides the possibility of arranging the roof drying unit at a small distance from the splash guard element, wherein, in the upper end position of the roof drying unit, a part of the roof drying unit extends into the recess of the splash guard element. Thus, the recess frees up room for a part of the roof drying unit when the roof drying unit assumes its upper end position.

When drying the vehicle, the roof drying unit is moved relative to the vehicle according to the course of the vehicle's contour. The roof drying unit generates a stream of air which removes the cleaning liquid from the vehicle. During the movement of the roof drying unit and therefore during the process of drying the vehicle, if possible no cleaning liquid is to drip from the splash guard element onto the vehicle because this would detract from the cleaning result. To this end, the lower edge of the splash guard element has arranged thereon a drain channel extending over the entire width of the splash guard element. The drain channel forms a drip intercepting device. In order to be able to intercept liquid drippings also in the area of the at least one recess, the drain channel extends over the area of the recess, forming in this area a movable end section which is capable of being moved back and forth between a first position and a second position. In its first position, the movable end section engages under the recess so that liquid droplets dripping down from the splash guard element in the area of the recess are intercepted and diverted by the movable end section of the drain channel. Once the drying process has been completed, the roof drying unit can be moved to its upper end position. A part of the roof drying unit can, in a space-conserving manner, thereby be positioned in a recess of the splash guard element, wherein the movable end section of the drain channel is moved to a second position in which it releases the recess.

The vehicle washing installation constructed in accordance with the invention is thus distinguished by a very compact configuration, wherein the roof drying unit can be positioned at a small distance from the splash guard element, and in addition thereto the vehicle wash facility constructed in accordance with the invention is distinguished by a very good cleaning result, in particular wherein liquid droplets are prevented from dripping from the splash guard element onto the vehicle during the movement of the roof drying unit. Despite the provision of at least one recess into which a part of the roof drying unit can extend when the roof drying unit is in its upper end position, there is no risk of liquid droplets from the area of the recess reaching the vehicle when the roof drying unit is being lowered.

Advantageously, the roof drying unit comprises a housing and comprises at least one blower having a blower motor and a turbine driven by the blower motor. By way of the turbine, an air stream can be generated which can be directed towards the vehicle.

The part of the roof drying unit extending into a recess of the splash guard element when the roof drying unit is in its upper end position can form for example a blower or a section of a blower, in particular a blower motor or a turbine.

Preferably, the splash guard element has two recesses, each extending in the area between a lateral edge and the lower edge of the splash guard element and into each of which a part of the roof drying unit extends when the roof drying unit assumes its upper end position, and the drain channel has two movable end sections, each capable of moving back and forth between a first and a second position, wherein said movable end sections in their first position in each case extend over the entire width of a recess and engage under the recess and in the second position thereof release the respective recess. Such a configuration has the advantage that the roof drying unit can have two parts that can be received in a space-conserving manner by a recess of the splash guard element in each case when the roof drying unit assumes its upper end position. The splash guard element can thus have a first recess in the area between a first lateral edge and the lower edge and can have a second recess in the area between a second lateral edge and the lower edge. With such a configuration, the drain channel of the splash guard element comprises a first movable end section which engages under the first recess when in its first position and a second movable end section which engages under the second recess when in its first position. When in their second position, the movable end sections release the two recesses so that two parts of the roof drying unit can be positioned in the recesses.

In order to achieve a very effective drying of the vehicle, it is advantageous for the roof drying unit to comprise two blowers, each of which is arranged adjacent to a support. Each blower or section of a blower can form a part of the roof drying unit, said part extending in a recess of the splash guard element when the roof drying unit is in its upper end position.

In particular, provision may be made for the splash guard element to have two recesses, into each of which a blower motor extends when the roof drying unit is in its upper end position.

It is advantageous for the drain channel to comprise a main section held stationary on the lower edge of the splash guard element, said main section having pivotally supported thereon the at least one movable end section. The main section can extend over the entire width of the splash guard element with the exception of the at least one recess, and the at least one movable end section of the drain channel can be pivotally supported on the main section. The pivot axis can be oriented horizontally and perpendicularly with respect to the lower edge of the splash guard element.

In particular, provision may be made for the main section of the drain channel to have a first end and a second end, wherein the first end has supported thereon a first movable end section and the second end has supported thereon a second movable end section for pivotal movement about pivot axes that are oriented parallel to each other.

Alternatively to having the movable end sections supported on the main section of the drain channel, provision may be made for at least one movable end section to be pivotally supported on a support of the vehicle wash facility.

It is advantageous for the at least one movable end section, when in its first position, to be inclined at an oblique angle to the horizontal, wherein the end thereof facing towards a support assumes a position lower than that of the end thereof facing away from the support. Such an orientation of the at least one movable end section in the first position thereof provides a structurally simple way of ensuring that liquid intercepted by the end section can flow off in a direction of a support under the action of gravity. The liquid is thus diverted to the side and outside so that there is no risk of the vehicle being blemished during the drying process by liquid droplets detaching from the splash guard element in the area of a recess.

The inclination of the at least one movable end section with respect to the horizontal in a first position thereof can be preferably from about 3° to about 10°, in particular about 5°.

In a preferred configuration, the vehicle washing installation comprises in addition to the roof drying unit at least one side drying unit arranged on a support and having one or more side drying nozzles by way of which a stream of air can be directed towards a side of the vehicle. It is advantageous if the at least one movable end section in its first position projects in a direction towards a support over the at least one side drying nozzle, preferably over the entire side drying unit, because this will ensure that liquid diverted by the movable end section in a direction of the support cannot be entrained by the stream of air generated by the side drying unit and be directed towards a side of the vehicle by said stream of air.

In an advantageous embodiment of the vehicle washing installation constructed in accordance with the invention, the at least one movable end section of the drain channel is movable back and forth between its first position and its second position depending on the movement of the roof drying unit. This ensures that the at least one movable end section assumes its first position when the roof drying unit is lowered from its upper end position in a direction towards its lower end position. Liquid droplets which detach from the splash guard element in the area of a recess thereof as the roof drying unit is being lowered are reliably intercepted by a movable end section of the drain channel which engages under the recess as soon as the roof drying unit releases the recess.

In order to be able to move the at least one movable end section back and forth between its first position and its second position, the vehicle wash facility can comprise a drive device, such as a piston/cylinder unit or an electric motor.

In a configuration that is particularly simple in structure, the at least one movable end section of the drain channel is capable of being moved from its first position to its second position by the roof drying unit. When the roof drying unit is moved to its upper end position, it transitions the at least one movable end section from the first position thereof in which it engages under a recess of the splash guard element to the second position thereof in which it releases the recess so that a part of the roof drying unit can extend into the recess.

It is particularly advantageous if the at least one movable end section is capable of being raised to its second position by the roof drying unit. In the transition to its upper end position, the roof drying unit can raise the at least one end section far enough for the latter to release a recess of the splash guard element and for a part of the roof drying unit to be able to extend into the recess.

For example, it may be provided that arranged on the roof drying unit, preferably on a blower motor or a turbine of the roof drying unit, is a driver which in the movement of the roof drying unit to its upper end position comes into contact against a movable end section and, upon further raising of the roof drying unit, transitions said movable end section to its second position. When the roof drying unit is lowered again later, the driver can release the at least one movable end section again.

It is advantageous if the at least one movable end section is capable of being moved automatically to its first position when lowering the roof drying unit. The transition from the second position to the first position can be effected under the action of the weight force of the movable end section without the need of extra drive elements.

The following description of an advantageous embodiment of the invention, taken in conjunction with the drawings, serves to explain the invention in greater detail.

DETAILED DESCRIPTION OF THE INVENTION

The drawings show a schematic view of an advantageous embodiment of a vehicle washing installation constructed in accordance with the invention, designated generally by the reference character 10. The vehicle washing installation 10 comprises a wash gantry 12 comprising a first vertical support 14 and a second vertical support 16 which are rigidly connected together by way of a traverse 18. A roof wash brush 20 is held in a height-adjustable manner on the two supports 14, 16. The roof wash brush 20 can be caused to rotate about a horizontally oriented axis of rotation 22 in a conventional manner by use of a brush motor known per se and therefore omitted from the drawing for clarity of illustration.

The wash gantry 12 can be moved along a vehicle to be cleaned, wherein the roof wash brush 20 can be adjusted in its height according to the course of the vehicle's contour in order to clean the engine hood, the windscreen, the roof and, where applicable, the boot lid of the vehicle.

In addition to the roof wash brush 20, the vehicle wash facility 10 comprises a first side wash brush 24 and a second side wash brush 26, each of which can be driven for rotation about a vertical axis of rotation 30 by a brush motor known per se and therefore likewise omitted from the drawing for clarity of illustration. The side wash brushes 24, 26 can be moved back and forth along the traverse 18 in a manner known per se in order to effect cleaning of the side surfaces of the vehicle while moving the wash gantry 12 along the vehicle.

Figure 4:
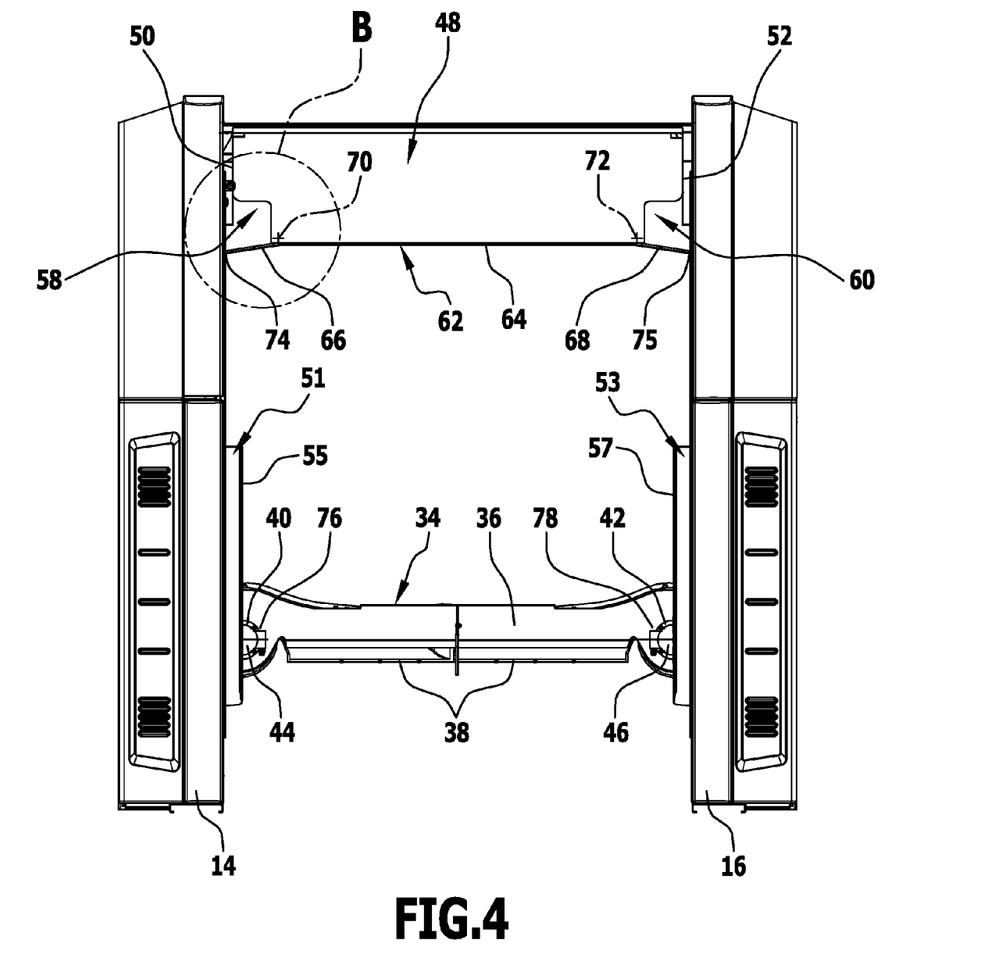
FIG. 4 is a schematic front view of the vehicle washing installation of FIG. 1, with the roof wash brush and the side wash brushes removed and with a roof drying unit assuming a lower end position.

Cleaning of the vehicle is effected with the aid of a cleaning liquid, preferably with the aid of water, said cleaning liquid being applied to the vehicle by way of spray nozzles known per se. Once the cleaning operation is completed, the vehicle is dried. To this end, the vehicle wash facility 10 comprises a roof drying unit 34 comprising a housing 36 which extends between the two supports 14, 16 and has a roof drying nozzle 38 via which the blow air can be blown out of the housing 36. In order to generate the blow air, the roof drying unit 34 has a first blower 40 and a second blower 42 which are each arranged immediately adjacent to a support 14 and 16 respectively. This is shown in FIG. 4 in particular. The first blower 40 has a first blower motor 44 which drives a first turbine, and the second blower 42 has a second blower motor 46 which drives a second turbine. The two turbines allow a stream of blow air to be created in a manner known per se, and said stream of blow air can be directed via the drying nozzle 38 towards the vehicle to be dried.

Figure 1:
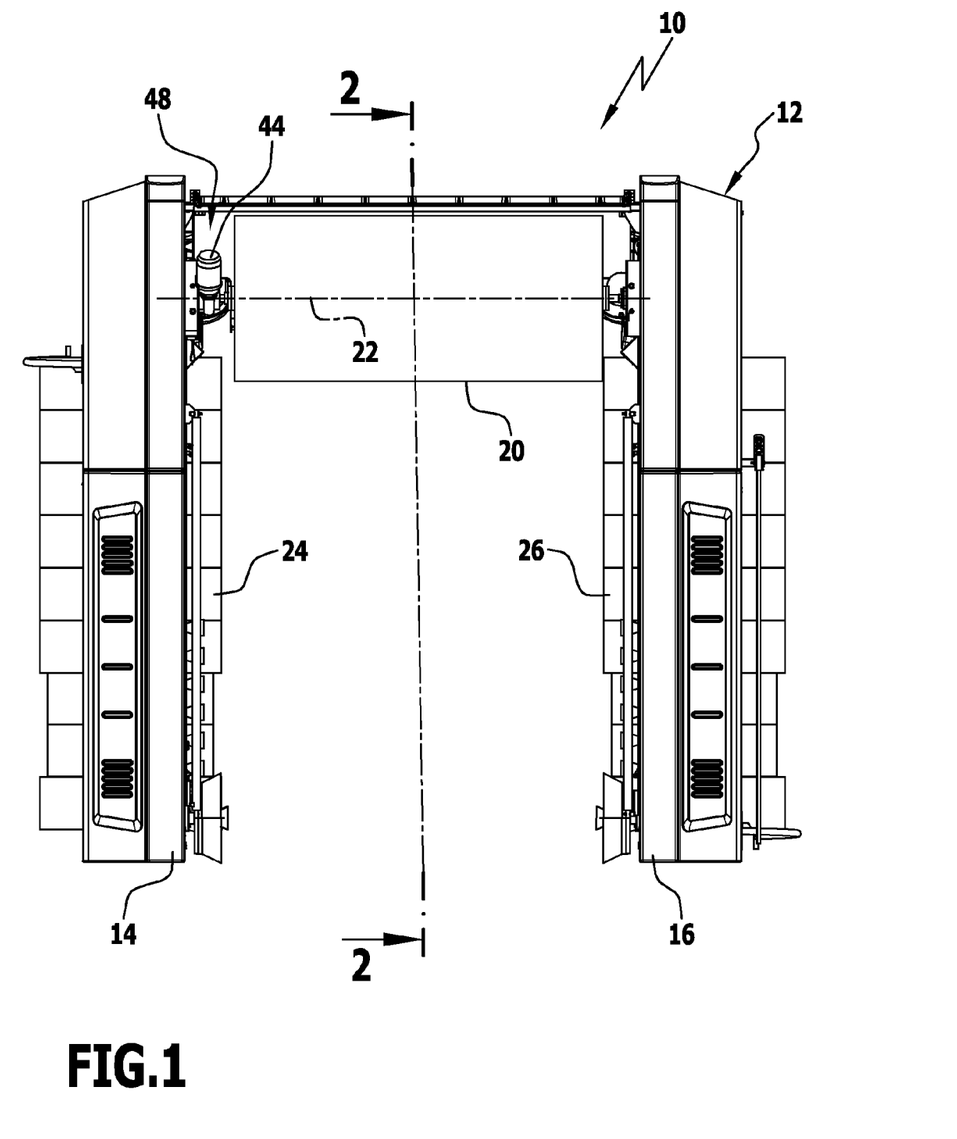
FIG. 1 is a schematic front view of a vehicle washing installation comprising a roof wash brush and two side wash brushes.
Figure 2:
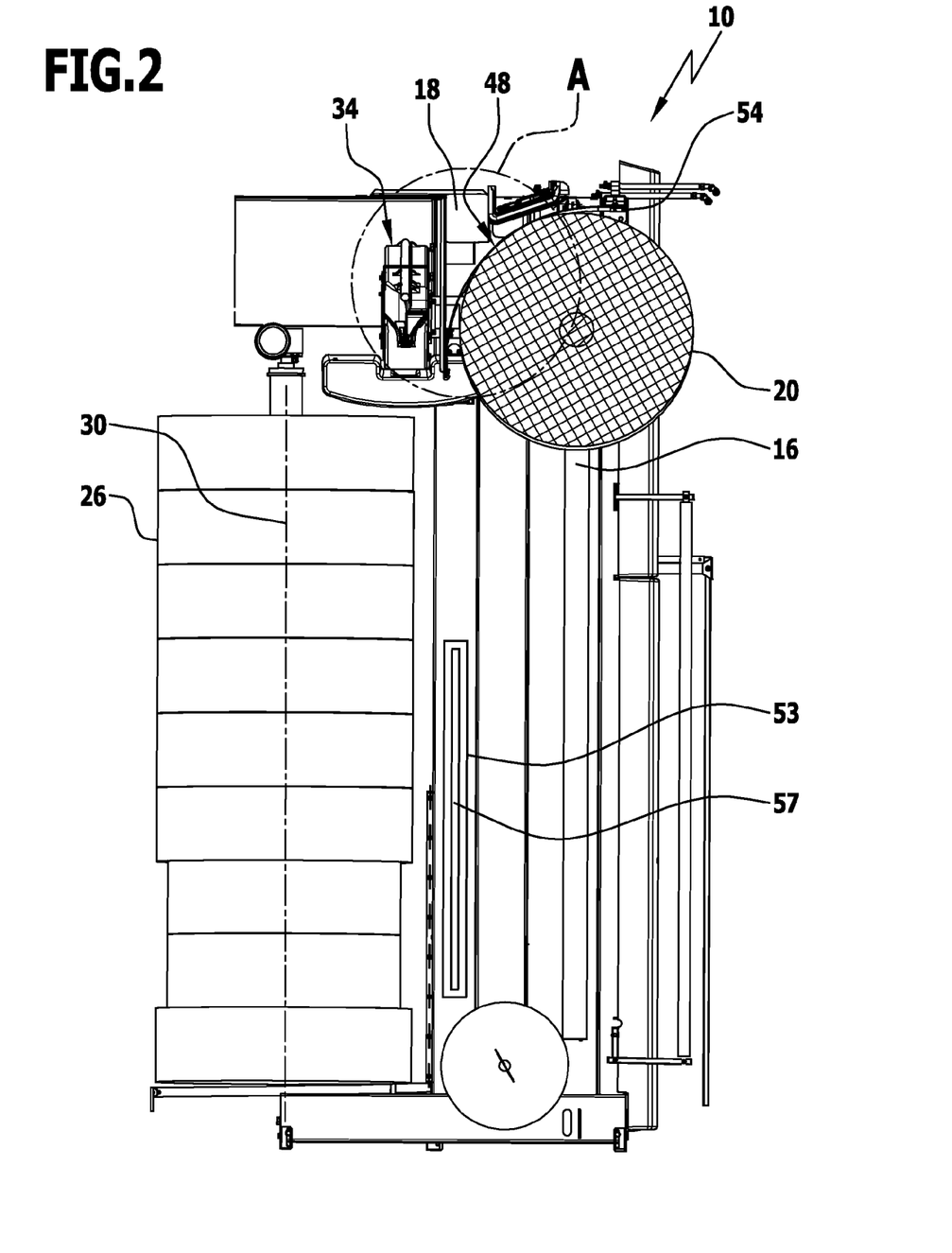
FIG. 2 is a sectional view of the vehicle washing installation along line 2-2 of FIG. 1.
Figure 3:
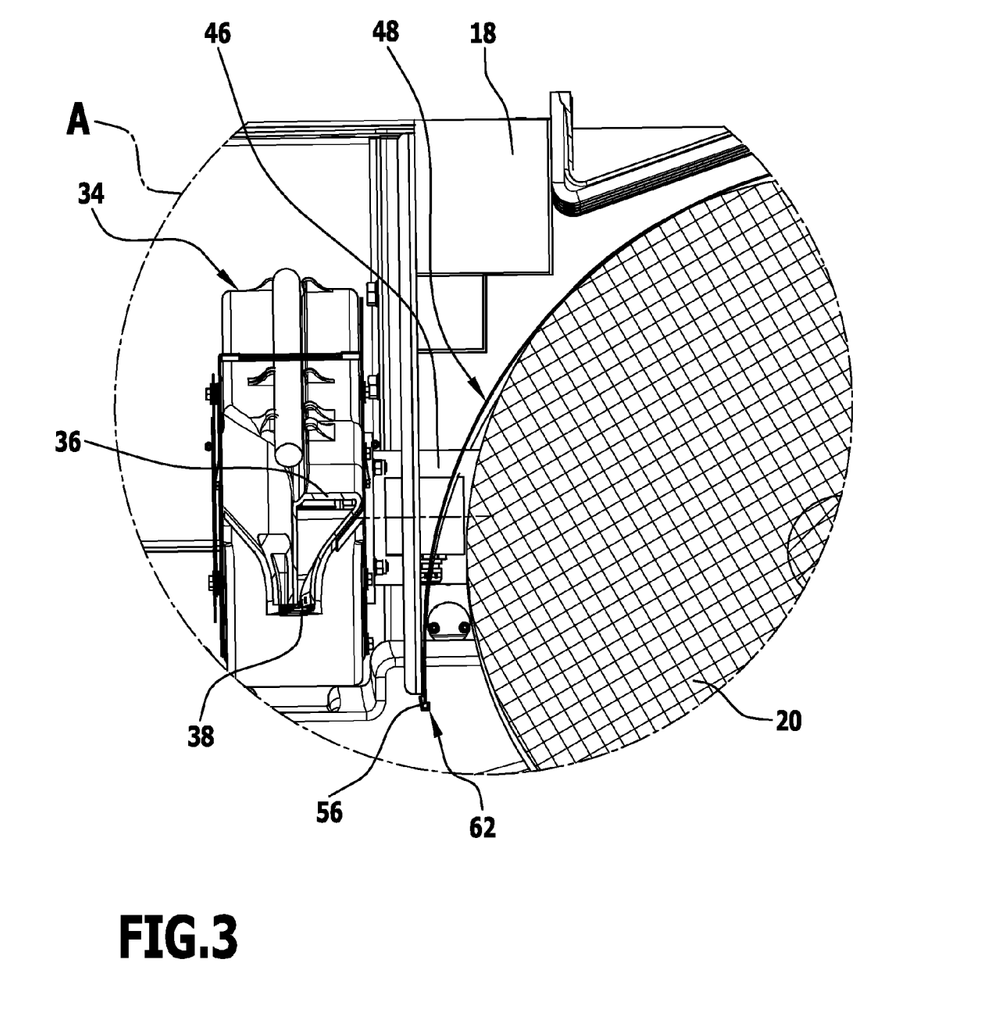
FIG. 3 shows the detail marked A in FIG. 2 to an enlarged scale.

The roof drying unit 34 is held separately from the roof wash brush 20 on the two supports 14, 16 and can be moved back and forth between an upper end position, shown in FIG. 2, and a lower end position, depicted in FIG. 4.

In order to effect drying of a vehicle, the vehicle washing installation 10 further comprises two side drying units 51, 53, each of which is arranged on a support 14 and 16 respectively and each of which comprises a side drying nozzle 55, 57 by which a stream of air can be directed towards the sides of the vehicle.

Arranged at a level of the traverse 18, between the roof wash brush 20 and the roof drying unit 34, is a splash guard element 48 in the approximate shape of a quarter cylinder, said splash guard element 48 surrounding the roof wash brush 20 in the upper end position thereof over an angular range of about 90° in a circumferential direction.

The splash guard element 48 is of sheet-form configuration and can be formed for example from sheet metal or from a plastics material. It has a first lateral edge 50 facing towards the first support 14 and a second lateral edge 52 facing towards the second support 16. Extending between the two lateral edges 50, 52, above the roof wash brush 20, is an upper edge 54 of the splash guard element 48, and at a position facing away from the upper edge 54 the splash guard element 48 has a lower edge 56. The upper edge 54 as well as the lower edge 56 is oriented horizontally, and the two lateral edges 50, 52 are curved in the shape of a circular arc and extend in a vertical plane in each case.

The two blower motors 44, 46 extend starting from the housing 36 of the roof drying unit 34 in a direction towards the roof wash brush 20. In order for the blower motors 44, 46 not to be interfered with by the splash guard element 48 when the roof drying unit 34 assumes its upper end position, the splash guard element 48 has a first recess 58 in the area between the first lateral edge 50 and the lower edge 56 and has a second recess 60 in the area between the second lateral edge 52 and the lower edge 56. This is shown in FIG. 4 in particular. When the roof drying unit 34 is moved to its upper end position, then the first blower motor 44 extends into the first recess 58 and the second blower motor 46 extends into the second recess 60. This permits the roof drying unit 34 to be arranged at a small distance from the splash guard element 48 so that the vehicle washing installation 10 has a very compact configuration. The blower motors 44, 46 thus form parts of the roof drying unit 34 which are, in the upper end position of the roof drying unit 34, received in a recess 58 and 60 respectively of the splash guard element 48. Alternatively or in addition, other parts of the splash guard element 48 could also be received by the recesses 58, 60.

In order to prevent liquid from dripping from the splash guard element 48 during a drying operation, the lower edge 56 of the splash guard element has arranged thereon a drip intercepting device in the form of a drain channel 62 which extends over the entire width of the splash guard element 48. The drain channel 62 has a main section 64 which extends from the first recess 58 to the second recess 60. In the area of the first recess 58, the main section 64 is adjoined by a first movable end section 66 of the drain channel 62, and in the area of the second recess 60 the main section 64 is adjoined by a second movable end section 68.

The two movable end sections 66, 68 are each held on the main section 64 for pivotal movement about pivot axes 70 and 72 respectively which are oriented horizontally and perpendicularly relative to the lower edge 56, and they can be moved back and forth between a first and a second position.

The cross-section of the drain channel 62 is essentially of a U-shaped configuration both in the area of the main section 64 and in the area of the movable end sections 66, 68.

In FIG. 4, the two movable end sections 66, 68 are shown as assuming their first position in each case. The first movable end section 66 in its first position extends over the entire width of the first recess 58 and engages under the first recess 58, wherein its free end 74 facing towards the first support 14 projects beyond the first lateral edge 50 in a direction towards the first support 14. In its first position, the first end section 66 is inclined at an angle of approximately 5° with respect to the horizontal, wherein its free end 74 assumes a position lower than that of the end thereof facing away from the first support 14, which adjoins the main section 64 of the drain channel 62. The free end 74 of the first movable end section projects in a direction towards the first support 14, beyond the side drying nozzle 55 of the first side drying unit 51.

In a corresponding manner, the second movable end section 68 in its first position extends over the entire width of the second recess 60 and engages under the second recess 60. The free end 75 of the second movable end section 68 facing towards the second support 16 projects laterally beyond the second lateral edge 52 in a direction towards the second support 16. The second end section 68 is also inclined at an angle of approximately 5° with respect to the horizontal when in its first position, with the free end 75 thereof assuming a position lower than that of the end thereof that faces away from the second support 16 and adjoins the main section 64 of the drain channel 62. The second movable end section 68 has its free end 75 projecting in a direction towards the second support 16 and beyond the side drying nozzle 57 of the second side drying unit 53.

The two movable end sections 66, 68, when in their first position, ensure that liquid dripping off the splash guard element 48 in the area of the first recess 58 and in the area of the second recess 60 cannot reach a vehicle arranged below the splash guard element 48; rather, the liquid is intercepted by the end sections 66, 68 and these, due to their inclination with respect to the horizontal, divert the liquid in a direction towards the first support 14 and the second support 16 respectively under the action of gravity. The movable end sections 66, 68 assume their first position during a drying operation.

Figure 6:
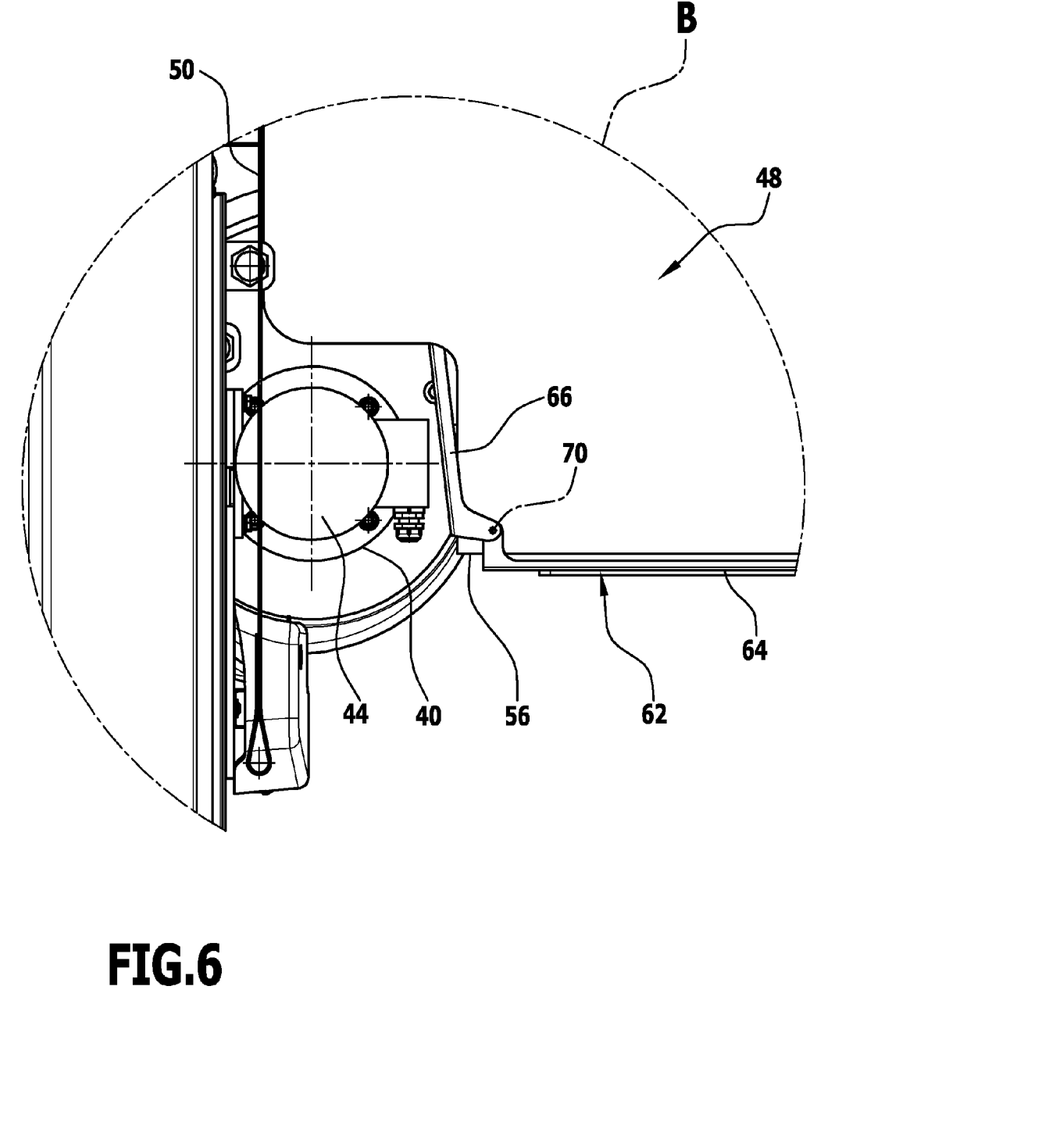
FIG. 6 shows the detail marked B in FIG. 4 to an enlarged scale, wherein the roof drying unit assumes its upper end position.

In their second position, the first end section 66 and the second end section 68 are at a slight slope with respect to the vertical and release the first recess 58 and the second recess 60. This is shown in FIG. 6 using the example of the first movable end section 66. The movable end sections 66, 68 assume their second position upon completion of a drying operation.

Figure 5:
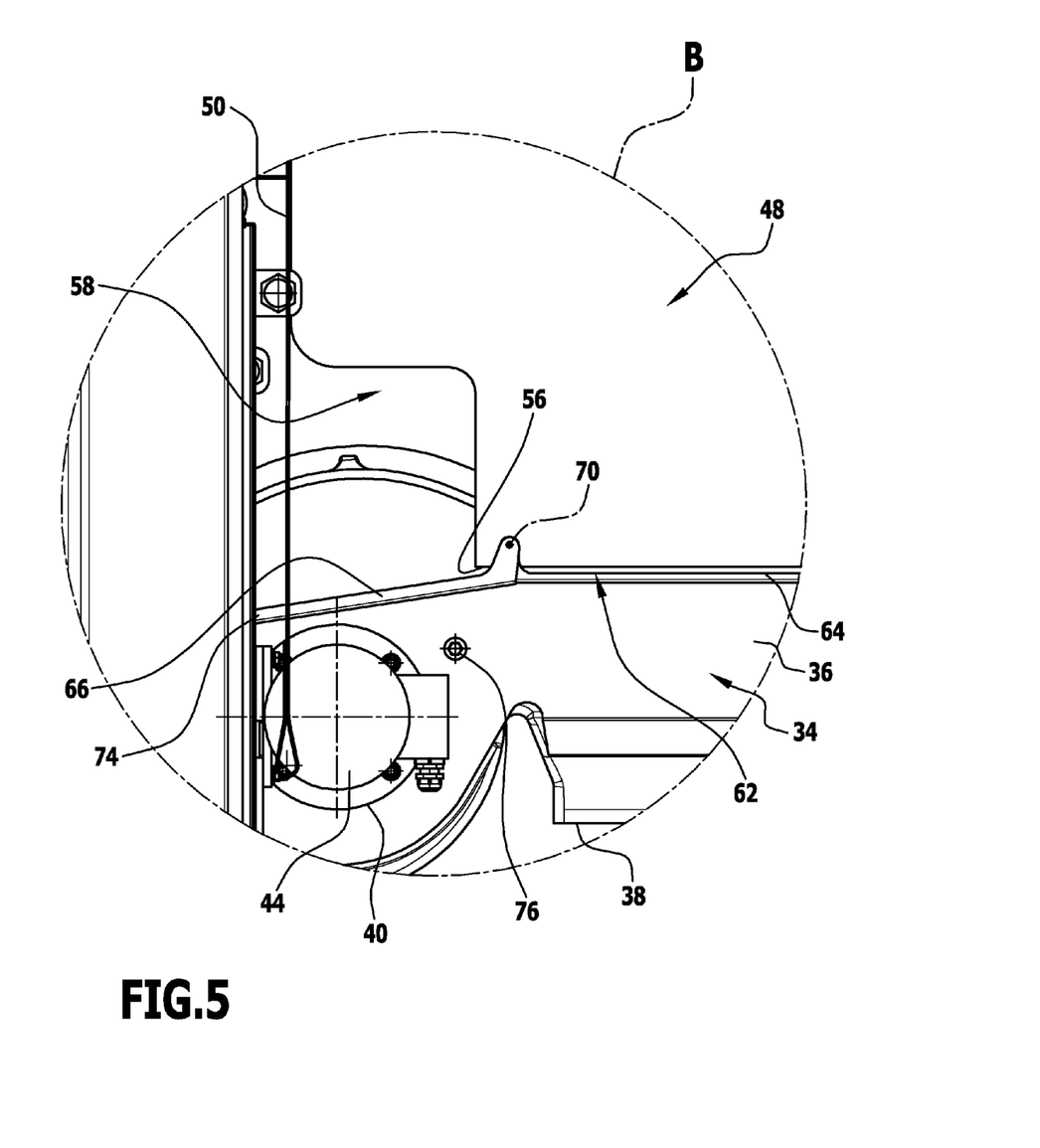
FIG. 5 shows the detail marked B in FIG. 4 to an enlarged scale, with the roof drying unit approaching an upper end position.

Movement of the first movable end section 66 from its first position to its second position is effected with the aid of a first driver 76 which is fixed to the housing 36 of the roof drying unit 34 at a location immediately adjacent to the first blower motor 44. When the roof drying unit 34 is moved to its upper end position, the first driver 76 reaches the underside of the first movable end section 66 and raises the first movable end section 66 when the first blower motor 44 extends into the first recess 58. This is shown in FIGS. 5 and 6. When the roof drying unit 34 is lowered again at a later point in time, the first driver 76 releases the first movable end section 66 which transitions to its first position automatically under the action of gravity.

Movement of the second movable end section 68 from its first position to its second position is effected in a manner corresponding to that described with reference to the movement of the first movable end section 66. A second driver 78 is arranged on the housing 36 of the roof drying unit 34, immediately adjacent to the second blower motor 46, for raising the second movable end section 68. When the second blower motor 46 extends into the second recess 60, the second driver 78 raises the second movable end section 68, and when the roof drying unit 34 is lowered, the second driver 78 releases the second movable end section 68 so that the latter transitions automatically from its second position to its first position under the action of gravity.

Thus, movement of the two end sections 66, 68 is effected depending on the movement of the roof drying unit 34.

The two end sections 66, 68 and the main section 64 ensure that there will be no liquid drippings from the splash guard element 48 when the roof drying unit 34 is lowered from its upper end position. Therefore, the drying result capable of being achieved by use of the roof drying unit 34 will not be impaired by liquid drips from the splash guard element 48. Furthermore, the movable end sections 66, 68 ensure that liquid drippings from the splash guard element 48 cannot enter the streams of air generated by the side drying units 51, 53 and be washed against the sides of the vehicle. Overall therefore, the vehicle washing installation 10 is distinguished by a very good cleaning result, while providing a very compact construction.

The invention claimed is:

1. A vehicle washing installation comprising a first and a second support on which a roof wash brush rotatable about a horizontal axis of rotation and a roof drying unit are held for movement up and down between upper and lower end positions independently from each other and comprising a splash guard element which is arranged between the roof wash brush and the roof drying unit at a height of the upper end positions of the roof wash brush and the roof drying unit, wherein the splash guard element has at least one recess which extends in the area between a lateral edge and a lower edge of the splash guard element and into which a part of the roof drying unit extends when the roof drying unit assumes its upper end position, wherein the lower edge of the splash guard element has arranged thereon a drain channel extending over the entire width of the splash guard element, said drain channel having at least one movable end section which is movable from a first position to a second position and back to the first position, wherein said at least one movable end section, when in its first position, extends over the entire width of one of the at least one recess and intercepts liquid droplets dripping down from the splash guard element in the area of said recess and, when in its second position, clears the way for said part of the roof drying unit to extend into said recess.

2. The vehicle washing installation in accordance with claim 1, wherein the part of the roof drying unit extending into said recess of the splash guard element when the roof drying unit is in its upper end position comprises a blower motor of the roof drying unit.

3. The vehicle washing installation in accordance with claim 1, wherein the splash guard element has a first recess and a second recess, each recess extending in the area between a lateral edge and the lower edge of the splash guard element and wherein the roof drying unit has a first and a second part, the first part of the roof drying unit extending into the first recess when the roof drying unit assumes its upper end position and the second part of the roof drying unit extending into the second recess when the roof drying unit assumes its upper end position, and wherein the drain channel has a first and a second movable end section, each of the first and second movable end sections being movable from a first position to a second position and back to the first position, wherein the first movable end section, when in its first position, extends over the entire width of the first recess and intercepts liquid droplets dripping down from the splash guard element in the area of the first recess and, when in its second position, clears the way of the first part of the roof drying unit into the first recess, and wherein the second movable end section, when in its first position, extends over the entire width of the second recess and intercepts liquid droplets dripping down from the splash guard element in the area of the second recess and, when in its second position, clears the way of the second part of the roof drying unit to extend into the second recess.

4. The vehicle washing installation in accordance with claim 1, wherein the drain channel comprises a main section held stationary on the lower edge of the splash guard element, said main section having pivotally supported thereon the at least one movable end section.

5. The vehicle washing installation in accordance with claim 1, wherein the at least one movable end section, when in its first position, is at an oblique angle to the horizontal, wherein the end thereof facing towards a support assumes a position lower than that of the end thereof facing away from the support.

6. The vehicle washing installation in accordance with claim 5, wherein the vehicle wash facility comprises at least one side drying unit arranged on a support and having one or more side drying nozzles, wherein the at least one movable end section in its first position projects in a direction towards the support over the at least one side drying nozzle.

7. The vehicle washing installation in accordance with claim 1, wherein the at least one movable end section is movable from its first position to its second position and back to its first position depending on the movement of the roof drying unit.

8. The vehicle washing installation in accordance with claim 1, wherein the at least one movable end section is capable of being moved from its first position to its second position by the roof drying unit.

9. The vehicle washing installation in accordance with claim 8, wherein the at least one movable end section is raisable to its second position by the roof drying unit.

10. The vehicle washing installation in accordance with claim 1, wherein the at least one movable end section is automatically movable to its first position when lowering the roof drying unit from the upper end position thereof.

* * * * *

UNITED STATES PATENT AND TRADEMARK OFFICE
CERTIFICATE OF CORRECTION

PATENT NO. : 10,023,157 B2
APPLICATION NO. : 14/958343
DATED : July 17, 2018
INVENTOR(S) : Speckmaier et al.

Page 1 of 1

It is certified that error appears in the above-identified patent and that said Letters Patent is hereby corrected as shown below:

In the Claims

At Column 9, Claim 3, Line 2, the text "guard element and wherein the roof" should be changed to -- guard element, and wherein the roof --

Signed and Sealed this
Ninth Day of April, 2019

Andrei Iancu
*Director of the United States Patent and Trademark Office*